Dec. 27, 1932. M. ALDERMAN, JR 1,892,598
CORN SHELLER
Filed May 19, 1930

Michael Alderman, Jr.
INVENTOR
BY Victor J. Evans
ATTORNEY

Patented Dec. 27, 1932

1,892,598

UNITED STATES PATENT OFFICE

MICHAEL ALDERMAN, JR., OF BREWSTER, FLORIDA

CORN SHELLER

Application filed May 19, 1930. Serial No. 453,808.

My present invention relates to improvements in corn shellers.

The primary object of the invention is the provision of an improved device of novel construction adapted for use in connection with the shelling of corn and whereby corn, either new or dried may be shelled in an easy and expeditious manner without liability of injury to the operator.

A further object is the provision of a hand operated corn sheller that shall comprise few parts but which shall be of a strong and sturdy construction, and likewise which can be cheaply manufactured and commercialized at a low price.

For a full and comprehensive understanding reference is to be had to the accompanying drawings which are to be read in connection with this application.

Figure 1:
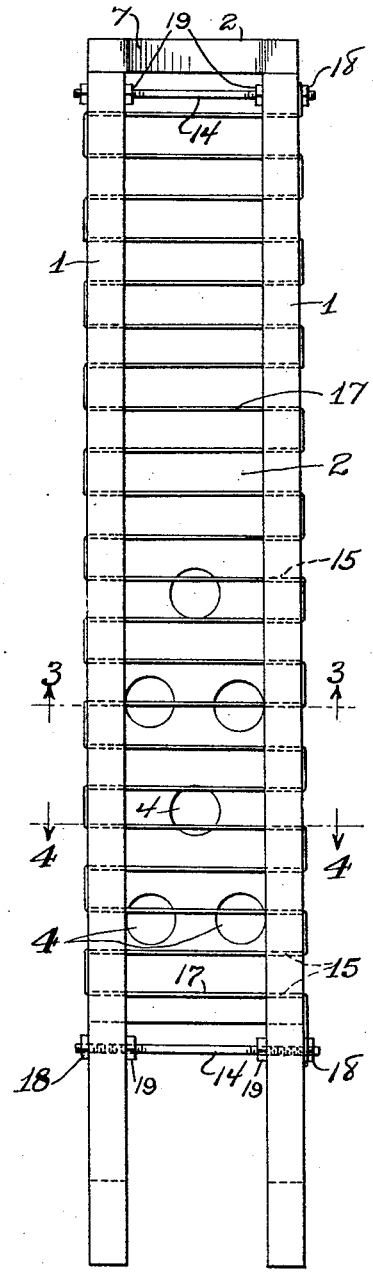
Figure 1 is a plan view of a corn sheller in accordance with the invention.
Figure 2:
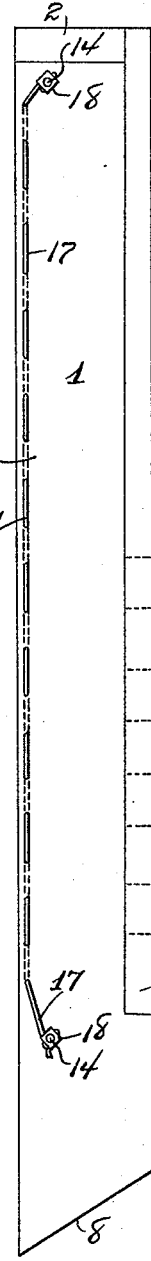
Figure 2 is a side elevation thereof.
Figure 3:
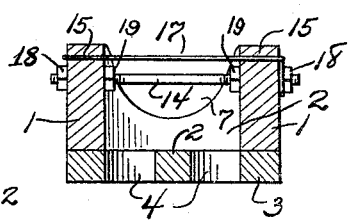
Figure 3 is a sectional view approximately on the line 3—3 of Figure 1, looking in the direction of the arrows.
Figure 4:
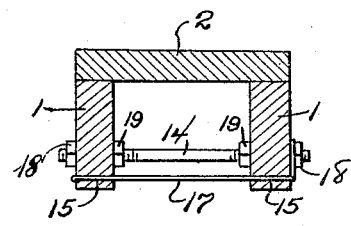
Figure 4 is a sectional view approximately on the line 4—4 of Figure 1, also looking in the direction of the arrows.

The cross sectionally U-shaped or trough body of my improvement is preferably constructed of wood. The body includes parallel sides 1 that has what I will term its outer or top end partially closed, as at 2, and a bottom 3 which is let in suitable grooves in the edges of the sides and which terminates a suitable distance away from the inner or lower end of the said sides. The bottom 3 is provided with series of spaced staggeredly related longitudinally disposed round openings 4, and the front of the top 2, between the sides 1, is concaved or rounded inwardly, as at 7.

The ends of the sides are cut angularly from what I will term the outer face of the trough to the inner face thereof, as indicated by the numeral 8. This provides the angle ends 8 at the sides to effectively rest upon the bottom of the pan, box or like receptacle that is designed to receive the shelled corn.

The sides of the said body, adjacent to the top and bottom thereof are braced by rods 14 which have threaded ends. The sheller comprises a single strand of suitable strong wire which is trained through alining openings 15 in the sides 1 of the body, at a suitable distance below the outer edges of the said sides. The ends of the wire sheller 17 are wound around the projecting ends of the opposed rods or bolts 14 and are held thereon by the outer nuts 18 which are screwed on said bolts, the said bolts having also screwed thereon inner nuts 19 to contact with the inner faces of the sides 1 of the body properly spacing and sustaining the said sides in parallelism. By threading the wire 17 through alining equidistantly spaced openings in the sides 1 the several transverse strands of the wire provide shelling blades, and obviously the tension of the blades may be adjusted by drawing upon the ends of the wire and winding the same around the bolts 14 and holding the same so wound by tightening the outer nuts 18 on the bolts 14.

The device, as previously stated, is to be arranged in a box or rather small utensil. The ear of corn, with the blossom end pointed downwardly, is brought first against the outer or upper blade of the improvement. The concaved upper end of the improvement permits of the ear of corn being freely received in the device and also prevents the operator from contacting with the blades. From experience I have found that by moving the ear of corn three or four times over the blades the corn will be effectively shelled, whether the said corn be dry or moist, and as a matter-or-fact not more than three movements of the corn over the sheller is required when the ear is dry. The improvement takes up no space in the corn bin and is especially designed for shelling seed corn. The openings 4 in the bottom of the trough-like body provide for the passage of the shelled corn so that there is no liability of the corn clogging in the trough. Of course, the space between the bottom and the ends of the sides 16 provide the main exit for the shelled corn.

Various changes may be made to the shape, size and arrangement of parts of the form of the improved seed corn sheller from those herein shown and described without departing from the spirit of the invention nor the scope of the claim.

Having described the invention, I claim:

A seed corn sheller, comprising a trough-like body having a partly open bottom, and having one end partly closed, the sides of the body, below the outer edges thereof being provided with equidistantly spaced alining openings, a strong wire threaded through said openings, and the transverse strands of the wire within the trough affording sheller blades, bolts passing through openings in the sides of the body adjacent to the ends thereof, said bolts having inner and outer nuts screwed thereon to contact with the inner and outer faces of the sides of the body for bracing and for spacing said sides, and the ends of the wire being wound around the outer ends of the bolts and being engaged by outer nuts on said respective bolts for holding the said wire on the body and for regulating the tension of said wire.

In testimony whereof I affix my signature.

MICHAEL ALDERMAN, Jr.